US012395009B2

(12) United States Patent
Patwa et al.

(10) Patent No.: US 12,395,009 B2
(45) Date of Patent: Aug. 19, 2025

(54) CONVERTIBLE ENERGY CONTROL SYSTEM

(71) Applicant: Unirac, Inc., Albuquerque, NM (US)

(72) Inventors: Daidipya Patwa, San Francisco, CA (US); Gaurang Kavaiya, Windermere, FL (US); Alberto Fonts, Castro Valley, CA (US)

(73) Assignee: UNIRAC, Inc., Albuquerque, NM (US)

( * ) Notice: Subject to any disclaimer, the term of this patent is extended or adjusted under 35 U.S.C. 154(b) by 0 days.

(21) Appl. No.: 18/093,178

(22) Filed: Jan. 4, 2023

(65) Prior Publication Data

US 2023/0216338 A1 Jul. 6, 2023

Related U.S. Application Data

(60) Provisional application No. 63/296,703, filed on Jan. 5, 2022.

(51) Int. Cl.
*H02J 9/06* (2006.01)
*B60L 53/16* (2019.01)
*B60L 55/00* (2019.01)
*H02J 3/32* (2006.01)
*H02J 3/38* (2006.01)
*H02J 7/00* (2006.01)

(52) U.S. Cl.
CPC .............. *H02J 9/062* (2013.01); *B60L 53/16* (2019.02); *B60L 55/00* (2019.02); *H02J 3/322* (2020.01); *H02J 3/381* (2013.01); *H02J 7/0048* (2020.01); *H02J 2207/20* (2020.01); *H02J 2300/22* (2020.01)

(58) Field of Classification Search
CPC .. H02J 9/062; H02J 3/322; H02J 3/381; H02J 7/0048; H02J 2207/20; H02J 2300/22; H02J 2300/24; H02J 2310/48; H02J 7/35; B60L 53/16; B60L 55/00; B60L 3/0092; B60L 53/51; B60L 53/63
See application file for complete search history.

(56) References Cited

U.S. PATENT DOCUMENTS

2018/0037121 A1* 2/2018 Narla ................. B60L 55/00
2018/0054064 A1 2/2018 Narla et al.
(Continued)

FOREIGN PATENT DOCUMENTS

WO WO-2013039753 A1 * 3/2013 .......... B60L 11/1816

*Primary Examiner* — Daniel Cavallari
(74) *Attorney, Agent, or Firm* — Knobbe Martens Olson & Bear LLP

(57) ABSTRACT

The present disclosure provides systems and methods for controlling an electrical system. The electrical system includes a plurality of backup power sources, such as an electric vehicle battery, a photovoltaic system, and an energy storage system. The electrical system includes a service panel electrically coupled to a plurality of electrical loads. The electrical system includes an energy control system electrically coupled to the plurality of backup power sources, the service panel, and a utility grid. The energy control system converts to a plurality of settings based on the number of available backup power sources. The energy control system determines the availability of the backup power sources according to a predetermined protocol such that one or more backup power sources are prioritized over other backup power sources.

12 Claims, 5 Drawing Sheets

(56) References Cited

U.S. PATENT DOCUMENTS

2020/0336002 A1 10/2020 Narla et al.
2020/0336003 A1 10/2020 Narla et al.
2021/0367447 A1 11/2021 Narla et al.

* cited by examiner

CONVERTIBLE ENERGY CONTROL SYSTEM

CROSS-REFERENCE TO RELATED APPLICATIONS AND INCORPORATION BY REFERENCE

This application claims priority to U.S. Provisional Patent Application No. 63/296,703 filed on Jan. 5, 2022, which is incorporated by reference herein in its entirety for all purposes.

FIELD

The present disclosure relates to an energy control system for interfacing with electrical systems having different power architectures.

BACKGROUND

Residential electrical systems vary from home to home. For example, residential electrical systems may differ by having various alternative energy sources, such as photovoltaic power generation systems and/or energy storage systems that provide power to the loads or back to the grid. These backup power sources may operate as a microgrid—a group of interconnected loads and local power sources acting independent to the utility grid—when there is a power outage.

Another potential alternative energy source for residential systems is the battery of an electric vehicle, which is typically linked to the residential electrical system via an electric vehicle charger kit. As electric vehicle battery technology has advanced over recent years, electric vehicles have grown in popularity. Accordingly, integrating electric vehicle chargers into residential electrical systems has become more common.

However, conventional power control systems in residential homes or commercial buildings lack the versatility to adapt to electrical systems having different power architectures. For example, some electrical systems may only have one or two backup power sources, such as a photovoltaic system and/or an electric vehicle charger, to minimize costs. In contrast, more costly electrical systems may have three or more backup power sources, such as a photovoltaic system, an energy storage system, and an electric vehicle charger, to provide microgrid operation for an extended period of time. To account for these various backup power architectures, some prior power control systems may have equipment that includes a large housing with multiple power buses and breaker pans. Other prior power control systems may have multiple electrical connection panels or subpanels, requiring load migration and a complicated setup.

BRIEF SUMMARY

Accordingly, there is a need, for example, for systems and procedures that improve the energy control system's versatility for interfacing with various electrical power architectures, while using minimal equipment, occupying a limited space, and simplifying setup.

In some embodiments, the present disclosure provides an electrical system. In some embodiments, the electrical system includes a plurality of backup power sources, which includes a first backup power source, a second backup power source, and a third backup power source. In some embodiments, the electrical system includes a service panel electrically coupled to a plurality of electrical loads. In some embodiments, the electrical system includes an energy control system. In some embodiments, the energy control system includes a grid interconnection electrically coupled to a utility grid, a load interconnection electrically coupled to the service panel, and a backup interconnection configured to be electrically coupled to the plurality of backup power sources. In some embodiments, the energy control system is configured to operate in a plurality of settings. In some embodiments, the plurality of settings include a first setting, in which the energy control system is electrically coupled to the first and second backup power sources and configured to receive power from the first backup power source. In some embodiments, the plurality of settings include a second setting, in which the energy control system is electrically coupled to the first and second backup power sources and configured to receive power from the first and second backup power sources. In some embodiments, the plurality of settings include a third setting, in which the energy control system is electrically coupled to the first, second, and third backup power sources and configured to receive power from the first, second, and third backup power sources.

In some embodiments, the first backup power source is a backup photovoltaic (PV) power generation system configured to generate power.

In some embodiments, the second backup power source is an electric vehicle (EV) charger port configured to charge power to and discharge power from an EV battery.

In some embodiments, when operating in the second setting, the energy control system is configured to receive power from the second backup power source before receiving power from the first backup power source.

In some embodiments, the third backup power source is an energy storage system configured store the power generated by the backup PV power generation system.

In some embodiments, when operate in the third setting, the energy control system is configured to receive power from the second backup power source before receiving power from the first and third backup power sources.

In some embodiments, when operating in the second setting, the energy control system is configured to receive power from the first and second backup sources according to a predetermined protocol.

In some embodiments, the second backup power source is prioritized over the first backup power source according to the predetermined protocol.

In some embodiments, when operating in the third setting, the energy control system is configured to receive power from the first, second, and third backup power sources according to a predetermined protocol.

In some embodiments, the second backup power source is prioritized over the first and third backup power sources according to the predetermined protocol.

In some embodiments, the energy control system is configured to switch between an on-grid mode electrically connecting the grid interconnection to the load interconnection and the backup interconnection, and a backup mode electrically disconnecting the grid interconnection from the load interconnection and the backup interconnection.

In some embodiments, the present disclosure provides an electrical system. In some embodiments, the electrical system includes a plurality of backup power sources, which includes a first backup power source, a second backup power source, and a third backup power source. In some embodiments, the electrical system includes a service panel electrically coupled to a plurality of electrical loads. In some embodiments, the electrical system includes an energy control system. In some embodiments, the energy control system includes a grid interconnection electrically coupled to a utility grid, a load interconnection electrically coupled to the service panel, and a backup interconnection configured to be electrically coupled to the plurality of backup power sources. In some embodiments, the energy control system includes a controller. In some embodiments, the controller is configured to determine whether the first backup power source is available for supplying power to the service panel. In some embodiments, the controller is configured to determine whether the second backup power source is available for supplying power to the service panel after determining the availability of the first backup power source. In some embodiments, the controller is configured to determine whether the third backup power source is available for supplying power to the service panel after determining the availability of the second backup power source.

In some embodiments, the present disclosure provides a method for controlling an electrical system. In some embodiments, the electrical system includes a plurality of backup power sources, a service panel electrically coupled to a plurality of electrical loads, and an energy control system. In some embodiments, the energy control system is electrically coupled to the plurality of backup power sources and the service panel. In some embodiments, the method includes a step of determining, by the energy control system, whether a first backup power source is available for supplying power to the service panel. In some embodiments, the method includes a step of determining, by the energy control system, whether a second backup power source is available for supplying power to the service panel after determining the availability of the first backup power source. In some embodiments, the first backup power source is an electric vehicle (EV) charger port configured to charge power to and discharge power from an EV battery.

In some embodiments, the step of determining the availability of the first backup power source includes determining whether a current state of charge of the EV battery exceeds a threshold charge level.

In some embodiments, the step of determining the availability of the first backup power source includes determining whether the EV charger port is electrically coupled to the EV battery.

In some embodiments, the second backup power source is an energy storage system comprising a storage battery.

In some embodiments, the step of determining the availability of the second backup power source includes determining whether a current state of charge of the storage battery of the energy storage system exceeds a threshold charge level.

In some embodiments, the method includes a step of determining, by the energy control system, whether a third backup power source is available for supplying power to the service panel after determining the availability of the second backup power source.

In some embodiments, the third backup power source is a backup photovoltaic (PV) power generation system configured to generate power.

In some embodiments, the step of determining the availability of the third backup power source includes determining whether a current power output of PV power generation system exceeds a power output threshold In some embodiments, the method further includes a step of disconnecting, by the energy control system, the service panel and the plurality of backup power sources from a utility grid before determining the availability of the first backup power source.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Figure 1:
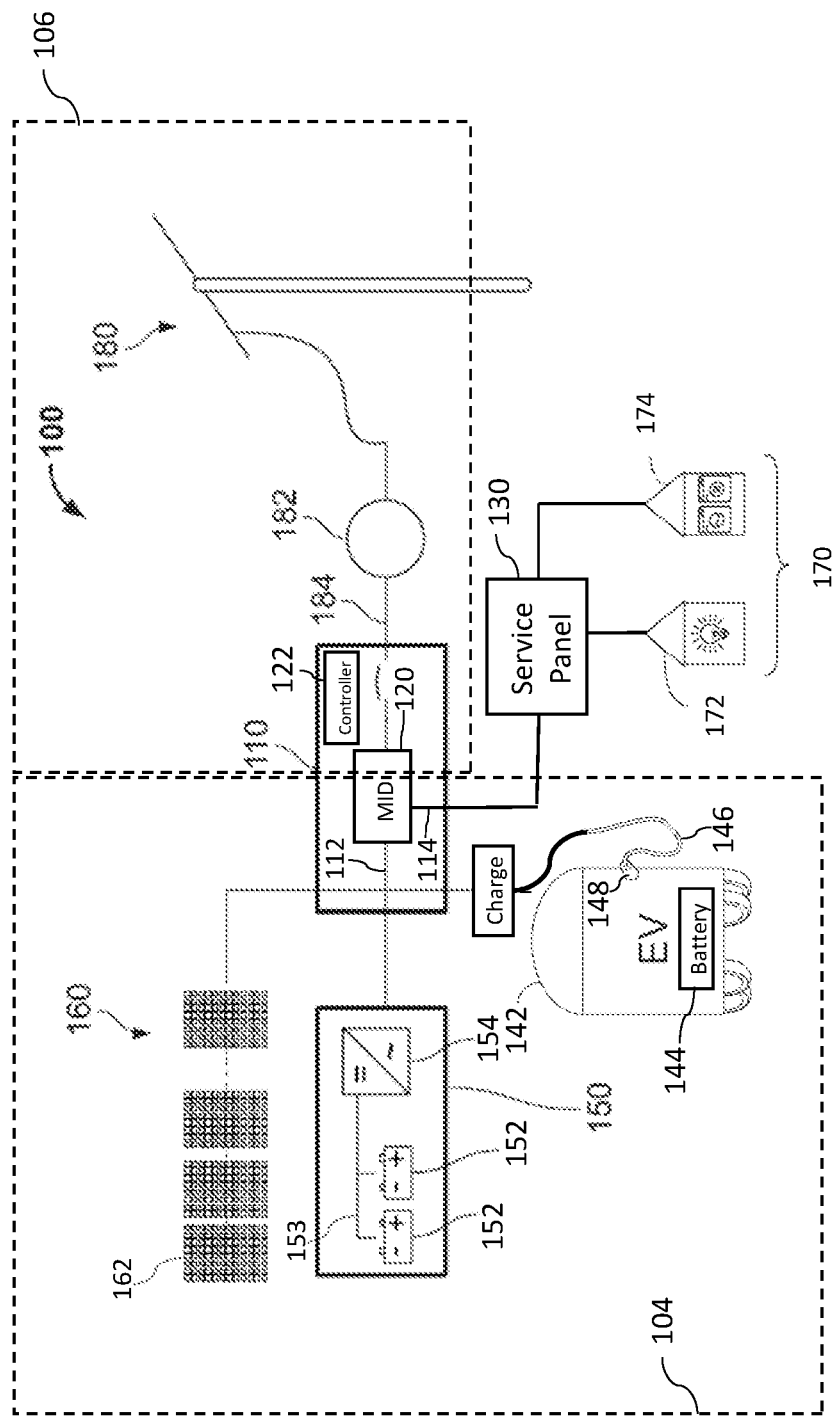
FIG. 1 illustrates an electrical system according to an embodiment.

The features and advantages of the embodiments will become more apparent from the detail description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The terms "micro-grid," "backup mode," and "off-grid" as used herein refer to a group of interconnected loads (e.g., plurality of backup loads) and power distribution resources (e.g., backup PV power generation system, energy storage system, and energy control system) that function as a single controllable power network independent from the utility grid.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

According to the embodiments described herein, the energy control system of the present disclosure can interface with electrical systems having different power architectures by operating according to a plurality of settings based on the number of available power sources, without using a backup and/or non-backup power ban. For example, in some embodiments, the energy control system can operate in a first setting, in which the energy control system is electrically coupled to a first backup power and/or a second backup power source and configured to receive power only from the first backup power source. In some embodiments, the energy control system can operate in a second setting, in which the energy control system is electrically coupled to a first and second backup power sources and configured to receive power from both the first and second backup power sources. In some embodiments, the energy control system can operate in a third setting, in which the energy control system is electrically coupled to the first, second, and third backup power sources and configured to receive power from the first, second, and third backup power sources. In some embodiments, the energy control system can determine the availability of the backup power sources according to a predetermined protocol such that one or more backup power sources are prioritized over other backup power sources.

By operating in multiple settings based on the number of available backup power sources and prioritizing the use of the backup power sources according to a predetermined protocol, the energy control system can efficiently manage backup power supply during backup mode, while using minimal equipment and occupying a limited space.

FIG. 1 shows an energy control system 110 for controlling the operation of an electrical system 100 according to embodiments. Electrical system 100 can include, for example, an EV charger port 140, an energy storage system 150, a backup photovoltaic ("PV") power generation system 160, a service panel 130 coupled to a plurality of electrical loads 170, and/or a connection (e.g., a power bus with a subpanel and/or meter 182) to a utility grid 180. In some embodiments, energy control system 110 can control the flow of energy between service panel 130, EV charger port 140, energy storage system 150, backup PV power generation system 160, the plurality of electrical loads 170, and/or the connection to the utility grid 180. In some embodiments, energy control system 110 and electrical system 100 can include any component or be operated in any way, as disclosed in U.S. application Ser. No. 16/811,832, filed Mar. 6, 2020, titled "ENERGY CONTROL SYSTEM," the entirety of which is incorporated herein by reference. In some embodiments, service panel 130, EV charger port 140, energy storage system 150, backup PV power generation system 160, and/or at least one of electrical loads 170 (e.g., plurality of backup loads 172) can be located on a backup side 104 of energy control system 110 such that energy control system 110, service panel 130, EV charger port 140, energy storage system 150, backup PV power generation system 160, and/or at least one of electrical loads 170 (e.g., plurality of backup loads 172) can be configured as a single controllable power network independent of utility grid 180. In some embodiments, utility grid 180 is electrically coupled to a non-backup side 106 of energy control system 110.

In some embodiments, EV charger port 140 can be electrically coupled to an EV 142 via, for example, an EV charger cable 146 to charge or discharge an EV battery 144 (e.g., via a bidirectional electrical connection). For example, in some embodiments, EV charger port 140 can be configured to distribute power received from energy storage system 150, backup PV power generation system 160, and/or utility grid 180 to EV battery 144. In some embodiments, EV charger port 140 can be configured to distribute power received from EV battery 144 to service panel 130 such that the plurality of electrical loads 170 are powered by EV battery 144. In some embodiments, EV charger cable 146 can include any component suitable for establishing an electrical connection between EV charger port 140 and EV battery 144, such as, for example, an EV charger handle 148 configured to be connected to a charging port of EV 142 and an EV charger connector configured to be received by EV charger port 140. In some embodiments, EV charger port 140 can be a wireless charging system (e.g., an induction charging system) configured to wirelessly charge or discharge EV battery 144.

In some embodiments, energy storage system 150 can include one or more storage batteries 152 configured to store power generated by backup PV power generation system 160. In some embodiments, energy storage system 150 can include a storage converter 154 (e.g., inverter) electrically coupled to storage batteries 152 by a direct current (DC) bus 153 and electrically coupled to energy control system 110 by an alternating current (AC) bus. In some embodiments, storage converter 154 can be configured to convert the DC current discharged from storage batteries 152 to an AC current that emulates power characteristics (e.g., voltage magnitude and frequency) of utility grid 180, such as for example, split phase AC at 240V/120V. In some embodiments, storage converter 154 can be configured to covert AC to DC. In some embodiments, storage converter 154 can be configured to adjust a charging rate and/or a discharging rate of the one or more storage batteries 152. In some embodiments, storage converter 154 can be configured adjust the frequency of power supplied by backup PV power generation system 160.

In some embodiments, backup PV power generation system 160 can include one or more power generation arrays (e.g., a photovoltaic panel array), and each power generation array can include one or more power generation units 162 (e.g., a photovoltaic panel) configured to generate power. In some embodiments, backup PV power generation system 160 can include one or more PV converters (e.g., a micro-inverter). In some embodiments, the PV converter can include any type of components (e.g., an inverter) such that the PV converter is configured to convert DC to AC or vice versa. In some embodiments, at least one PV converter can synchronize the phase of the power feed to split-phase AC that is compatible with the utility grid. In some embodiments, the PV converter can be a part of a power generation unit. In some embodiments, one, two, three, four, or more power generation units can be interconnected to a single PV converter (e.g., a string inverter). In some embodiments, backup PV power generation system 160 can include one or more power optimizers such as, for example, DC power optimizers. In some embodiments, backup PV power generation system 160 can include a feed circuit configured to distribute power to the energy control system 110.

In some embodiments, service panel 130 can include an electrical interface to distribute power to the plurality of electrical loads 170 from one or more sources (e.g., EV charger port 140, energy storage system 150, and/or backup PV power generation system 160) on backup side 104 of energy control system 110 or utility grid 180. In some embodiments, service panel 130 can include any suitable component, such as, for example, an input port, for receiving power from one or more sources (e.g., EV charger port 140, energy storage system 150, and/or backup PV power generation system 160) on backup side 104 of energy control system 110 or utility grid 180. In some embodiments, service panel 130 can include any suitable component, such as, for example, a set of bus bars, circuit breakers, fuses, and/or contacts, for distributing power to the plurality of electrical loads 170.

In some embodiments, the plurality of electrical loads 170 can be separated into backup load(s) 172 and auxiliary load(s) 174. In some embodiments, a plurality of backup loads 172 includes one or more essential loads that automatically continue to receive power from EV charger port 140, backup PV power generation system 160 and/or energy storage system 150 during a power grid outage, and a plurality of auxiliary loads 174 includes one or more non-essential loads that do not automatically receive power from EV charger port 140, backup PV power generation system 160, and/or energy storage system 150 during a grid power outage. In the context of the present disclosure, an electrical load can be, for example, one or more devices or systems that consume electricity. In some embodiments, the plurality of electrical loads 170 can include all or some of the electrical devices associated with a building (e.g., a residential home). In some embodiments, the plurality of electrical loads 170 can include 240-volt loads. In some embodiments, the plurality of electrical loads 170 can include, for example, an electric range/oven, an air conditioner, a heater, a hot water system, a swimming pool pump, and/or a well pump. In some embodiments, the plurality of electrical loads 170 can include 120-volt loads. In some embodiments, the plurality of electrical loads 170 can include, for example, power outlets, lighting, networking and automation systems, a refrigerator, a garbage disposal unit, a dishwasher, a washing machine, other appliance, a septic pump, and/or an irrigation system.

In some embodiments, energy control system 110 can include any number of interconnections to control the flow of energy between service panel 130, EV charger port 140, energy storage system 150, backup PV power generation system 160, the plurality of electrical loads 170, and/or utility grid 180. For example, in some embodiments, energy control system 110 can include a grid interconnection 184 electrically coupled to a utility grid 180 so that grid power is distributed to energy control system 110. In some embodiments, grid interconnection 184 can include a main overcurrent protection device 183 that is electrically disposed between utility grid 180 and other components of energy control system 110. In some embodiments, energy control system 110 can include a backup interconnection 112 electrically coupled to EV charger port 140, energy storage system 150, and/or backup PV power generation system 160 so that power from one or more of the backup sources (e.g., EV charger port 140, energy storage system 150, and/or backup PV power generation system 160) is distributed to energy control system 110. In some embodiments, energy control system 110 can include a load interconnection 114 electrically coupled to service panel 130 so that power from one or more of the backup sources (e.g., EV charger port 140, energy storage system 150, and/or backup PV power generation system 160) and/or utility grid 180 is distributed to service panel 130, ultimately one or more of the plurality of electrical loads 170. In the context of the present disclosure, an interconnection includes any suitable electrical structure, such as a power bus, wiring, a panel, etc., configured to establish electrical communication between two components.

In some embodiments, energy control system 110 can include a microgrid interconnection device 120 (e.g., an automatic transfer or disconnect switch) electrically coupled to backup interconnection 112, load interconnection 114, and grid interconnection 184, such that microgrid interconnection device 120 is electrically coupled to backup interconnection 112, load interconnection 114, and/or grid interconnection 184. In the context of the present disclosure, a microgrid interconnection device can be, for example, any device or system that is configured to automatically connect circuits, disconnect circuits, and/or switch one or more loads between power sources. In some embodiments, microgrid interconnection device 120 can include any combination of switches, relays, and/or circuits to selectively connect and disconnect respective interconnections 112, 114, and 184 electrically coupled to energy control system 110. In some embodiments, such switches can be automatic disconnect switches that are configured to automatically connect circuits and/or disconnect circuits. In some embodiments, such switches can be transfer switches that are configured to automatically switch one or more loads between power sources.

In some embodiments, microgrid interconnection device 120 can be configured to operate in an on-grid mode, in which microgrid interconnection device 120 electrically connects the backup interconnection 112 to both load interconnection 114 and grid interconnection 184. In some embodiments, when operating in the on-grid mode, microgrid interconnection device 120 can be configured to distribute power received from utility grid 180 to load interconnection 114 (e.g., to power the plurality of electrical loads 170) and/or backup interconnection 112 (e.g., to power EV charger port 140 and/or energy storage system 150). In some embodiments, when operating in the on-grid mode, microgrid interconnection device 120 can be configured to distribute power received from EV charger port 140, energy storage system 150, and/or backup PV power generation system 160 to load interconnection 114 (e.g., to power the plurality of electrical loads 170) and/or grid interconnection 184 (e.g., to distribute excess power to utility grid 180).

In some embodiments, microgrid interconnection device 120 can be configured to operate in a backup mode, in which microgrid interconnection device 120 electrically disconnects both grid interconnection 184 from backup interconnection 112 and load interconnection 114. In some embodiments, when operating in the backup mode, microgrid interconnection device 120 can disrupt electrical communication between the plurality of electrical loads 170 and utility grid 180. In some embodiments, when operating in the backup mode, microgrid interconnection device 120 can disrupt power received from EV charger port 140, energy storage system 150, and/or backup PV power generation system 160 from reaching utility grid 180.

In some embodiments, energy control system 110 can include a controller 122 in communication with microgrid interconnection device 120 and configured to control the distribution of power between service panel 130, EV charger port 140, energy storage system 150, backup PV power generation system 160, the plurality of electrical loads 170, and/or utility grid 180. In some embodiments, controller 122 can be configured to detect the status (e.g., power outage or voltage restoration) of grid interconnection 184 and switch microgrid interconnection device 120 between the on-grid mode and the backup mode based on the status of grid interconnection 184. If the status of grid interconnection 184 indicates a power outage, controller 122 can be configured to switch microgrid interconnection device 120 to the backup mode. If the status of grid interconnection 184 indicates a voltage restoration, controller 122 can be configured to switch microgrid interconnection device 120 to the on-grid mode.

In some embodiments, controller 122 can include a communication interface (e.g., one or more antennas) for sending and/or receiving data over a wireless network. In some embodiments, energy control system 110 includes one or more load meters that monitor the current or voltage through one or more elements of electrical system 100 and transmit data indicating the monitored current or voltage to controller 122. For example, a load meter can monitor voltage, current, and/or power from microgrid interconnection device 120 to load interconnection 114. A load meter can monitor voltage, current, and/or power from microgrid interconnection device 120 to backup interconnection 112. A load meter can monitor voltage, current, and/or power from grid interconnection 184 to microgrid interconnection device 120.

In some embodiments, controller 122 can include a site consumption current transformer (CT) for monitoring the quantity of energy consumption by the plurality of electrical loads 170. In some embodiments, site CT can be operatively connected to grid interconnection 184. In some embodiments, controller 122 can include a PV production CT for monitoring the quantity of PV energy outputted from backup PV power generation system 160.

In some embodiments, controller 122 can be configured to communicate with EV charger port 140 to determine the current state of charge of EV battery 144 of EV 142. In some embodiments, controller 122 can be configured to determine whether to charge power to or draw power from EV battery 144 of EV 142 based on the current state of charge of EV battery 144.

In some embodiments, controller 122 can be configured to process timeseries data and/or disable a reconnection timer of backup PV power generation system 160. In some embodiments, controller 122 can transmit commands to a converter of backup PV power generation system 160 to adjust (e.g., increase or decrease) power output of backup PV power generation system 160 based on received data. In some embodiments, controller 122 can be configured to initiate a grid reconnection timer of backup PV power generation system 160.

In some embodiments, controller 122 can be configured to communicate with a battery monitoring system ("BMS") of energy storage system 150. In some embodiments, controller 122 can communicate with energy storage system 150 and can, for example, process timeseries data, read power information, write charge/discharge targets, and/or write "heartbeats." In some embodiments, controller 122 can receive status and/or power information from microgrid interconnection device 120.

In some embodiments, controller 122 can receive and transmit electronic data (e.g., computer-processable data and/or information represented by an analog or digital signal) over a network, such as, for example, Wireless Local Area Network ("WLAN"), Campus Area Network ("CAN"), Metropolitan Area Network ("MAN"), or Wide Area Network ("WAN"), with components of EV charger port 140, energy storage system 150, backup PV power generation system 160, a user's device (e.g., user's smartphone or personal computer), smart device (e.g., load meter) and/or smart appliances (e.g., smart outlets, smart plugs, smart bulbs, smart washers, smart refrigerators). In some embodiments, electronic data can include timeseries data, alerts, metadata, outage reports, power consumption information, backup power output information, service codes, runtime data, etc.

In some embodiments, controller 122 can receive electronic data (e.g., from a load meter) related to load consumption of the plurality of electrical loads 170, including backup loads 172 and/or auxiliary loads 174. In some embodiments, electronic related to the plurality of electrical loads 170 can include the information regarding the amount of power consumed by the plurality of electrical loads 170 (including backup loads 172 and/or auxiliary loads 174) and the times at which the power was consumed by the plurality of electrical loads 170. In some embodiments, controller 122 can use the collected electronic data to determine a load average per circuit and/or a load average per smart device corresponding to discrete blocks of time throughout the day. For example, time blocks can be broken down into 1-hour blocks, 2-hour blocks, 3-hour blocks, or other time blocks, including, for example, user-designated time blocks (e.g., times when the user may be asleep, at home, or out of the house). In some embodiments, controller 122 can use the collected data to determine an energy demand based on the amount of power consumed by the plurality of electrical loads 170.

In some embodiments, controller 122 can create a time-of-use library (e.g., a database or other structured set of data) that can define a circuit load average for each load and/or a smart device load average for each smart device with respect to the discrete blocks of time throughout the day. In some embodiments, controller 122 can use this information to determine which backup loads 172 receive power as a default during a grid power outage. In some embodiments, controller 122 can use this information to average load consumption by the plurality of backup loads 172 and/or auxiliary loads 174 profiled over a day of time. In some embodiments, the controller 122 can use the average load demand by the plurality of backup loads 172 and/or auxiliary loads 174 to be the predicted load demand.

In some embodiments, the converter of backup PV power generation system 160 can transmit to controller 122 electronic data related to backup PV power generation system 160. In some embodiments, electronic data related to backup PV power generation system 160 can include a current (e.g., an instantaneous) power output of backup PV power generation system 160. In some embodiments, electronic data related to backup PV power generation system 160 can include historical power output measurements of backup PV power generation system 160 recorded over an extended period of time (e.g., days, weeks, months). In some embodiments, electronic data related to backup PV power generation system 160 can include the average power output of the backup PV power generation system 160 profiled over a day of time. In some embodiments, controller 122 can calculate a predicted power output of backup PV power generation system 160 based on the historical data and other information, such as, for example, weather forecasts and state of the power generation arrays (e.g., power output capacity). In some embodiments, controller 122 uses the average power output of the backup PV power generation system 160 as a predicted power output for controlling operations of electrical system 100.

In some embodiments, storage converter 154 of energy storage system 150 can transmit to controller 122 electronic data related to energy storage system 150. In some embodiments, electronic data related to energy storage system 150 can include information relating to the amount of energy currently stored in energy storage system 150 (e.g., a current state of charge) and/or the amount of energy that energy storage system 2750 is capable of absorbing (e.g., via charging). In some embodiments, electronic data related to energy storage system can include the amount of energy being discharged (e.g., current discharging rate and/or the duration of the battery discharging) or predicted to be discharged (e.g., based on a time-of-use library) from energy storage system 150.

In some embodiments, electrical components (e.g., interconnections, switches, relays, circuit breakers, AC bus) of energy control system 110 can be integrated into a single housing.

Figure 2:
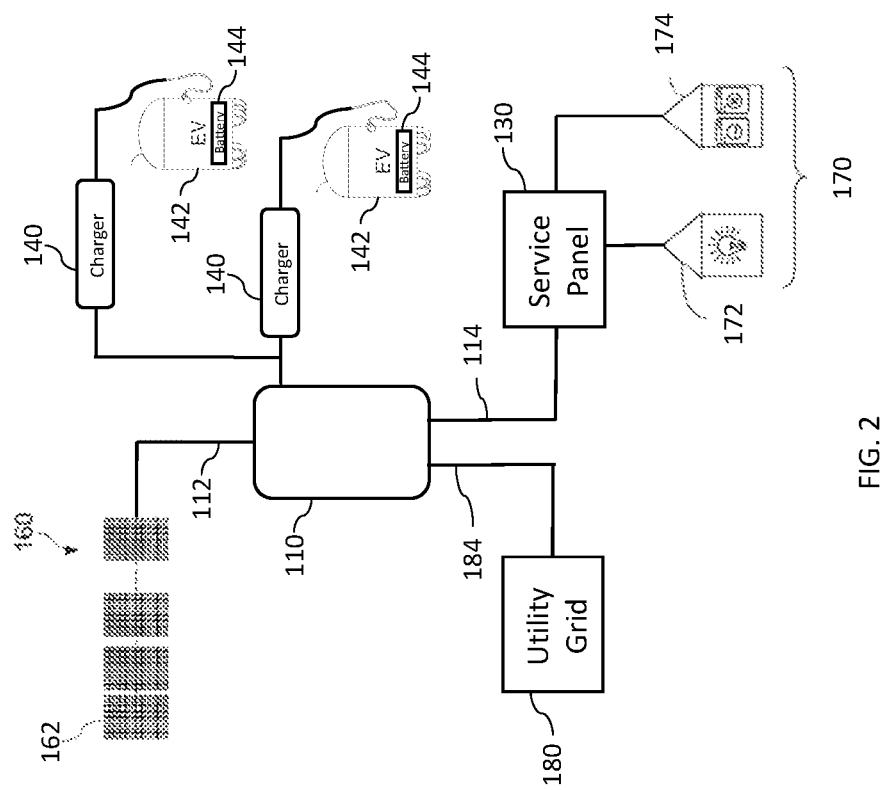
FIG. 2 illustrates an electrical system according to an embodiment.
Figure 3:
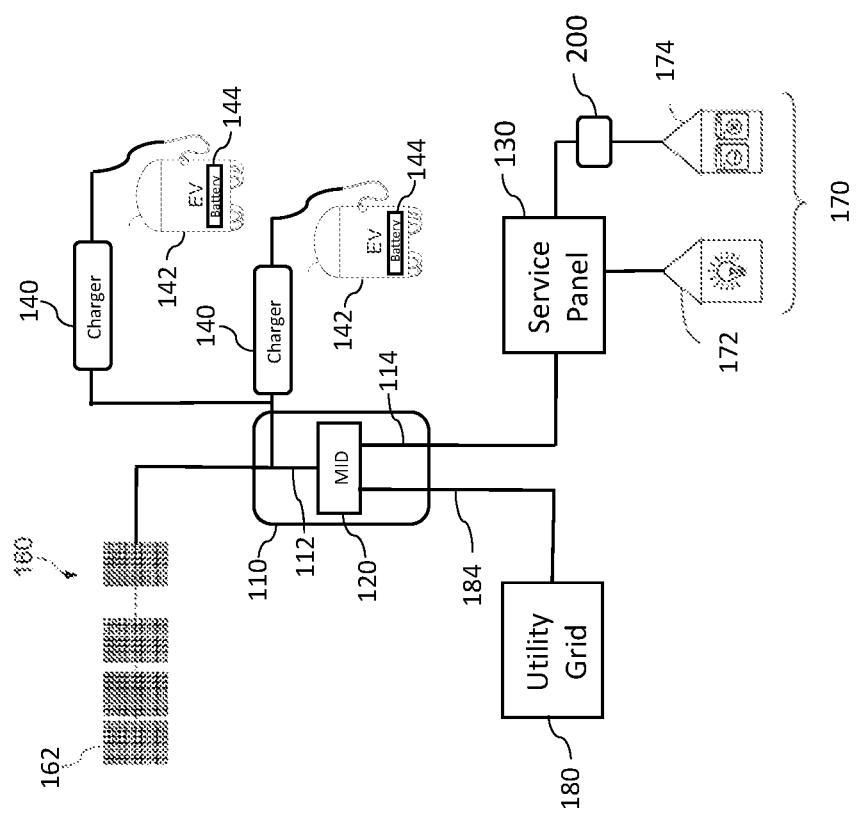
FIG. 3 illustrates an electrical system according to an embodiment.
Figure 4:
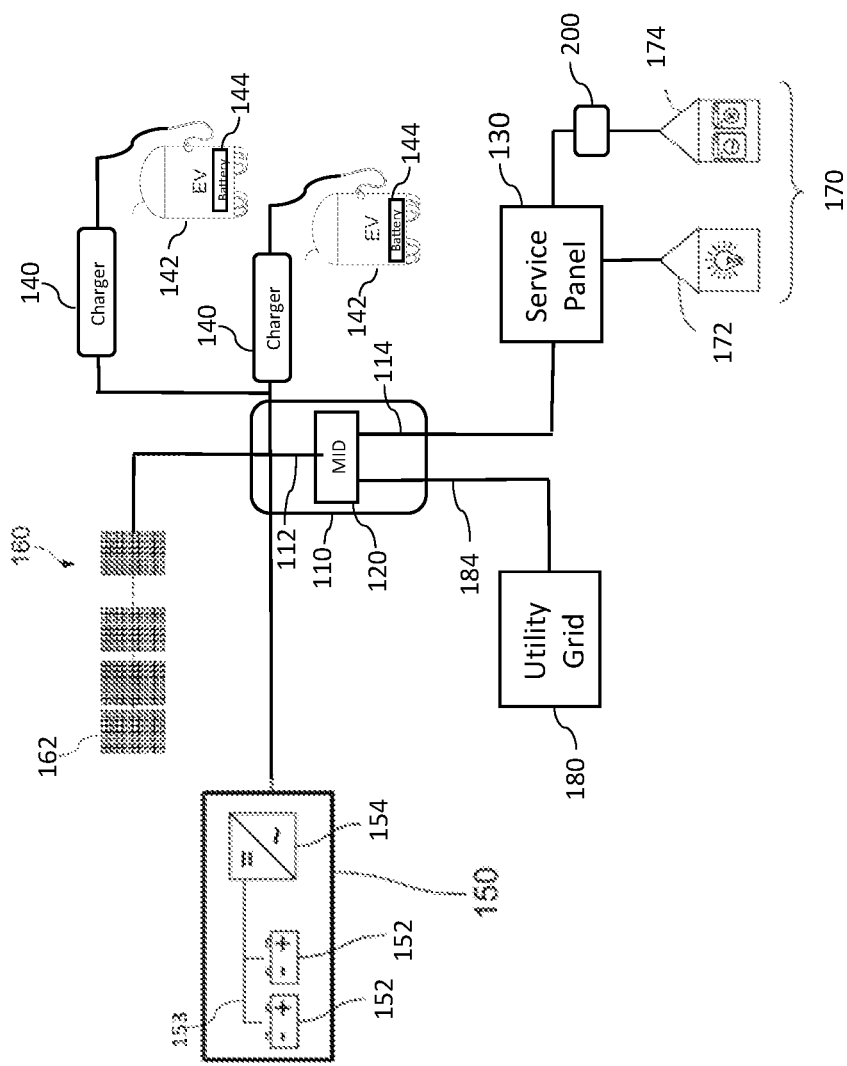
FIG. 4 illustrates an electrical system according to an embodiment.

In some embodiments, as shown in FIGS. 2-4, for example, energy control system 110 can operate in multiple settings based on the number of available backup power sources in electrical system 100, without having a backup power bus or a non-backup power bus. In some embodiments, energy control system 110 can switch between multiple settings by adding or removing one or more breaker pans to backup interconnection 112. In each of the settings shown in FIGS. 2-4, energy control system 110 can keep large loads, such as, auxiliary loads 174, on backup side 104 without any load migration. In each of the settings shown in FIGS. 2-4, energy control system 110 can allow large and unwanted loads, such as, one or more of the auxiliary loads 174, to be selectively turned-off. For example, service panel 130 can be a smart load panel having a plurality of remotely-controlled breakers connected to the plurality of electrical loads 170, such that any one of the plurality of electrical loads 170 can be selectively connected or disconnected from load interconnection 114 of energy control system 110. In some embodiments, energy control system 110 can communicate with service panel 130 by transmitting commands to selectively disconnect any one of the plurality of electrical loads 170.

In each of the settings shown in FIGS. 2-4, energy control system 110 can be configured to monitor current, voltage, and/or power inputted from all backup power sources (e.g., EV charger port 140, energy storage system 150, and/or backup PV power generation system 160) and control power output of the available backup power sources to remain compliant National Electrical Code (NEC) 2020 PCS controls (e.g., section 705.13). For example, in some embodiments, energy control system 110 can have a maximum ampacity rating, such as 200 amps, and energy control system 110 can disrupt power inputted from one or more of the backup power sources (e.g., EV charger port 140, energy storage system 150, and/or backup PV power generation system 160) when a detected current rating of energy control system 110 exceeds the maximum ampacity rating. In each of the settings shown in FIGS. 2-4, energy control system 110 can include multiple EV charger ports 140 configured to be coupled to a plurality of EVs 142.

According to some embodiments, FIG. 2 shows energy control system 110 operating in a first setting, in which backup interconnection 112 is electrically coupled to EV charger port 140 and/or backup PV power generation system 160. In some embodiments, when operating in the first setting, energy control system 110 can be configured to receive power only from backup PV power generation system 160, for example, during backup mode. The first setting simplifies operation of energy control system 110 during the backup mode by limiting power supply to one backup power source (e.g., backup PV power generation system 160), while still providing the user of electrical system 100 the capability to later add more backup power sources (e.g., EV charger port 140 and/or energy storage system 150) to backup side 104 of energy control system 110. In some embodiments, when operating in the first setting, energy control system 110 can operate in another setting (e.g., setting shown in FIGS. 3 and 4) such that microgrid interconnection device 120 is incorporated into the housing of energy control system 110 and energy storage system 150 is coupled to backup interconnection 112.

According to some embodiments, FIG. 3 shows energy control system 110 operating in a second setting, in which backup interconnection 112 is electrically coupled to EV charger port 140 and/or backup PV power generation system 160 and energy control system 110 includes microgrid interconnection device 120 electrically coupled to backup interconnection 112, load interconnection 114, and grid interconnection 184. When operating in the second setting, energy control system 110 can receive power from EV charger port 140 and/or backup PV power generation system 160, for example, when energy control system 110 is operating in the backup mode. In some embodiments, electrical system 100 can include a remotely-controlled breaker 200 configured to connect and disconnect one or more of the auxiliary loads 174 from load interconnection 114 of energy control system 110. In some embodiments, controller 122 can communicate with remotely-controlled breaker 200 to selectively connect and disconnect one or more auxiliary loads 174 from energy control system 110. In some embodiments, when operating in the second setting, energy control system 110 can operate in another setting (e.g., setting shown in FIG. 4) such that energy storage system 150 is coupled to backup interconnection 112. In some embodiments, the second setting can use EV battery 144 as the only local power storage unit for electrical system 100, while still providing the user of electrical system 100 the capability to later add another local storage system (e.g., energy storage system 150).

In some embodiments, while energy control system 110 is operating in the second setting, EV charger port 140 can supply power to backup side 104 of energy control system 110 when the state of charge of EV battery 144 exceeds a predetermined level. For example, in some embodiments, when the current state of charge of EV battery 144 is greater than a first threshold (e.g., when current state of charge is at least 80% of a rated capacity of EV battery 144), EV charger port 140 can discharge power from EV battery 144 as a backup power source for backup side 104 of energy control system 110. In some embodiments, the power capacity of EV battery 144 can range from about 20 kWh to about 150 kWh, depending on the type of EV 142 serviced by EV charger port 140. For example, in some embodiments, EV 142 can be a pickup truck, in which EV battery 144 has a power rating of about 125 kWh that can supply enough power to backup the plurality of electrical loads 170 (e.g., having a total capacity of 30 kWh) for three to four days. In some embodiments, when EV 142 is unavailable (e.g., not at home) and/or the current state of charge of EV battery 144 is below the first threshold, backup PV power generation system 160 can serve as backup power source for backup side 104 of energy control system 110.

According to some embodiments, FIG. 4 shows energy control system 110 operating in a third setting, in which energy storage system 150, backup PV power generation system 160, and EV charger port 140 are electrically coupled to backup interconnection 112 and energy control system 110 includes microgrid interconnection device 120 electrically coupled to backup interconnection 112, load interconnection 114, and grid interconnection 184. When operating in the third setting, energy control system 110 can receive power from EV charger port 140, energy storage system 150, and/or backup PV power generation system 160, for example, when energy control system 110 is operating in the backup mode. In some embodiments, while energy control system 110 is operating in the third setting, EV charger port 140 can supply power on backup side 104 of energy control system 110 in the same manner as when energy control system 110 is operating in the second setting. For example, in some embodiments, when the current state of charge of EV battery 144 is greater than a first threshold (e.g., when current state of charge is at least 80% of a rated capacity of EV battery 144), EV charger port 140 can discharge power from EV battery 144 as a backup power source for backup side 104 of energy control system 110. In some embodiments, when EV 142 is unavailable (e.g., not at home) and/or the current state of charge of EV battery 144 is below the first threshold, energy storage system 150 and/or backup PV power generation system 160 can serve as a backup power source for backup side 104 of energy control system 110.

In some embodiments, controller 122 of microgrid interconnection device 120 can be configured to selectively discharge power from one or more of the backup power sources (e.g., EV charger port 140, energy storage system 150, and/or backup PV power generation system 160) according to a predetermined protocol. In some embodiments, the predetermined protocol allows controller 122 to prioritize the use of the available backup power source for energy control system 110. For example, in some embodiments, the predetermined protocol can set EV charger port 140 as the first available backup power source, which is prioritized over the other backup power sources. In some embodiments, the predetermined protocol can set energy storage system 150 as the first available backup power source. In some embodiments, the predetermined protocol can set backup PV power generation system 160 as the first available backup power source. In some embodiments, the predetermined protocol can set energy storage system 150 as the second available power source, which is prioritized over backup PV power generation system 160. In some embodiments, the predetermined protocol can set EV charger port 140 as the second available backup power source. In some embodiments, the predetermined protocol can set backup PV power generation system 160 as the second available backup power source.

Figure 5:
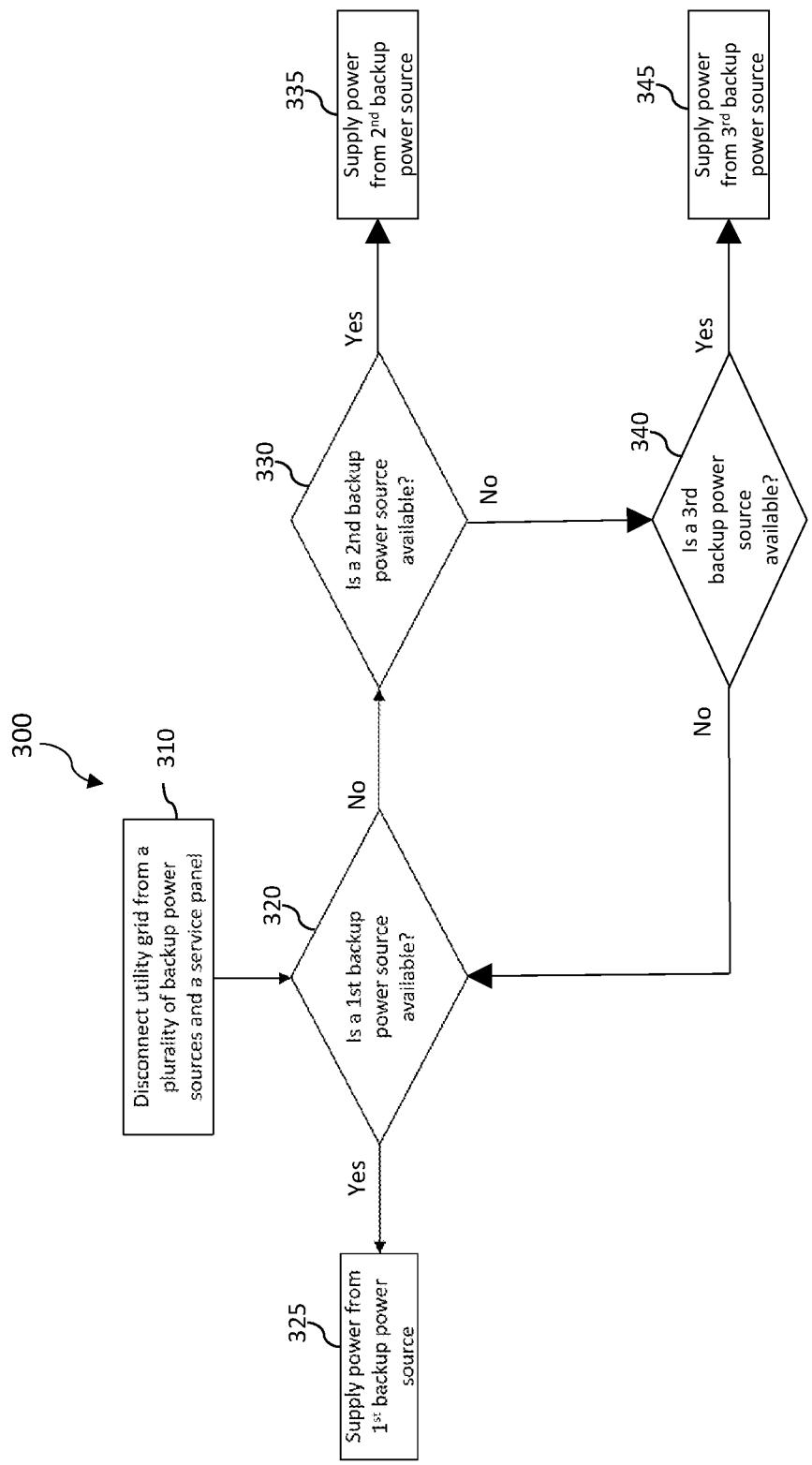
FIG. 5 illustrates a block diagram showing aspects of a method for controlling an electrical system according to an embodiment.

FIG. 5 shows an example block diagram illustrating aspects of a method 300 of controlling electrical system 100, by a controller, such as, for example, controller 122 of microgrid interconnection device 120. In some embodiments, method 300 can be executed by a controller located remotely with respect to energy control system 110, such as, for example, a smartphone or a computer that is in electrical communication (e.g., wired or wirelessly) with energy control system 110 over a network (e.g., WLAN, CAN, MAN, WAN, cellular, etc.). One or more aspects of method 300 can be implemented using hardware, software modules, firmware, tangible computer readable media having instructions stored thereon, or a combination thereof and can be implemented in one or more computer systems or other processing systems.

In some embodiments, method 300 can include a step 310 of disconnecting grid interconnection 184 from a plurality of backup power sources (e.g., EV charger port 140, energy storage system 150, and/or backup PV power generation system 160) and service panel 130. In some embodiments, step 310 can include disconnecting grid interconnection 184 in response to detecting a power outage at grid interconnection 184. In some embodiments, step 310 can include setting microgrid interconnection device in backup mode.

In some embodiments, method 300 can include a step 320 of determining whether a first backup power source is available for supplying power to service panel 130. In some embodiments, the first backup power source can include EV charger port 140 electrically coupled to EV battery 144. In some embodiments, step 320 can include determining whether a current state of charge of EV battery 144 exceeds a first threshold charge level. In some embodiments, the first threshold charge level can be set in a range from about 50% to about 90% of the energy rating of EV battery 144, such as, for example, 80% of the energy rating of storage battery 152. In some embodiments, step 320 can include determining whether EV charger port 140 is electrically coupled to EV battery 144. In some embodiments, the first backup power source can include energy storage system 150 or backup PV power generation system 160.

In some embodiments, when step 320 indicates that the first backup power source is available, method 300 can include a step of 325 of supplying power from the first backup power source to the service panel 130. In some embodiments, step 325 can include using EV charger port 140 to discharge power from EV battery 144 to load interconnection 114, such that EV battery 144 supplies power to one or more of the plurality of electrical loads 170 electrically coupled to service panel 130. In some embodiments, step 325 can include selectively disconnecting one or more of the auxiliary loads 174 from service panel 130 before discharging power from EV battery 144. In some embodiments, after power is supplied from the first backup power source in step 325, method 300 can proceed to other steps (e.g., step 330 and/or step 340) shown in flow chart of FIG. 5.

In some embodiments, when step 320 indicates that the first backup power source is not available, method 300 can include a step of 330 of determining whether a second backup power source is available for supplying power to service panel 130. In some embodiments, the second backup power source can include storage batteries 152 of energy storage system 150. In some embodiments, step 330 can include determining whether a current state of charge of storage battery 152 exceeds a second threshold charge level. In some embodiments, the second threshold charge level can be set in a range from about 50% to about 90% of the energy rating of storage battery 152, such as, for example, 60%, 70%, or 80% of the energy rating of storage battery 152. In some embodiments, the second backup power source can include EV charger port 140 or backup PV power generation system 160.

In some embodiments, when step 330 indicates that the second backup power source is available, method 300 can include a step of 335 of supplying power from the second backup power source to the service panel 130. In some embodiments, step 335 can include discharging power from storage batteries 152 of energy storage system 150 to load interconnection 114, such that storage batteries 152 supply power to one or more of the plurality of electrical loads 170 electrically coupled to service panel 130. In some embodiments, step 335 can include selectively disconnecting one or more of the auxiliary loads 174 from service panel 130 before discharging power from storage batteries 152. In some embodiments, after power is supplied from the second backup power source in step 335, method 300 can proceed to other steps (e.g., step 340) shown in the flow chart of FIG. 5.

In some embodiments, when step 330 indicates that the second backup power source is not available, method 300 can include a step of 340 of determining whether a third backup power source is available for supplying power to service panel 130. In some embodiments, the third backup power source can include backup PV power generation system 160. In some embodiments, step 340 can include determining whether a current power output of backup PV power generation system 160 exceeds a power output threshold. In some embodiments, the power output threshold can be set to the load demand of one or more of the plurality of electrical loads 170. For example, in some embodiments, the power output threshold can be set to the load demand of the plurality of backup loads 172.

In some embodiments, when step 340 indicates that the third backup power source is available, method 300 can include a step of 345 of supplying power from the third backup power source to the service panel 130. In some embodiments, step 345 can include supplying power from backup PV power generation system 160 to load interconnection 114, such that backup PV power generation system 160 supplies power to one or more of the plurality of electrical loads 170 electrically coupled to service panel 130. In some embodiments, step 345 can include selectively disconnecting one or more of the auxiliary loads 174 from service panel 130 before discharging power from backup PV power generation system 160. In some embodiments, after power is supplied from the third backup power source in step 335, method 300 can return to other steps (e.g., returning to step 320) shown in the flow chart of FIG. 5.

In some embodiments, when step 340 indicates that the third backup power is not available for supplying power, method 300 can return to step 320 to determine if the first and second backup power sources are available after a predetermined amount of time. In some embodiments, steps 310-340 of method 300 can be executed in different orders such that at least one backup power source is supplying power to service panel 130 while energy control system 110 is operating in the backup mode.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An electrical system, comprising:
a plurality of backup power sources including a first backup power source, a second backup power source, and a third backup power source;
a service panel electrically coupled to a plurality of electrical loads and a remotely-controlled breaker, wherein the remotely-controlled breaker is coupled to one or more of the plurality of electrical loads; and
an energy control system having a grid interconnection electrically coupled to a utility grid, a load interconnection electrically coupled to the service panel, and a backup interconnection configured to be electrically coupled to the plurality of backup power sources, wherein the energy control system is configured to:
adjust power inputted from one or more of the plurality of backup power sources when a detected current rating of the energy control system exceeds a maximum ampacity rating;
in response to disrupting the power inputted, operate in one of a plurality of settings, the settings comprising:
a first setting, wherein the energy control system is electrically coupled to the first and second backup power sources and configured to receive power from the first backup power source,
a second setting, wherein the energy control system is electrically coupled to the first and second backup power sources and configured to receive power from the first and second backup power sources, and
a third setting, wherein the energy control system is electrically coupled to the first, second, and third backup power sources and configured to receive power from the first, second, and third backup power sources; and
send instructions to the remotely-controlled breaker to connect the one or more of the plurality of electrical loads to the load interconnection.

2. The electrical system of claim 1, wherein the first backup power source is a backup photovoltaic (PV) power generation system configured to generate power.

3. The electrical system of claim 2, wherein the second backup power source is an electric vehicle (EV) charger port configured to charge power to and discharge power from an EV battery.

4. The electrical system of claim 3, wherein operating in the second setting, the energy control system is configured to receive power from the second backup power source before receiving power from the first backup power source.

5. The electrical system of claim 3, wherein the third backup power source is an energy storage system configured store the power generated by the backup PV power generation system.

6. The electrical system of claim 5, wherein operating in the third setting, the energy control system is configured to receive power from the second backup power source before receiving power from the first and third backup power sources.

7. The electrical system of claim 1, wherein operating in the second setting, the energy control system is configured to receive power from the first and second backup sources according to a predetermined protocol.

8. The electrical system of claim 7, wherein the second backup power source is prioritized over the first backup power source according to the predetermined protocol.

9. The electrical system of claim 1, wherein operating in the third setting, the energy control system is configured to receive power from the first, second, and third backup power sources according to a predetermined protocol.

10. The electrical system of claim 9, wherein the second backup power source is prioritized over the first and third backup power sources according to the predetermined protocol.

11. The electrical system of claim 1, wherein the energy control system is configured to switch between:
   an on-grid mode electrically connecting the grid interconnection to the load interconnection and the backup interconnection; and
   a backup mode electrically disconnecting the grid interconnection from the load interconnection and the backup interconnection.

12. An electrical system, comprising:
   a plurality of backup power sources including a first backup power source, a second backup power source, and a third backup power source;
   a service panel electrically coupled to a plurality of electrical loads and a remotely-controlled breaker, wherein the remotely-controlled breaker is coupled to one or more of the plurality of electrical loads; and
   an energy control system having a grid interconnection electrically coupled to a utility grid, a load interconnection electrically coupled to the service panel, and a backup interconnection configured to be electrically coupled to the plurality of backup power sources,
   wherein the energy control system includes a controller configured to:
      determine whether the first backup power source is available for supplying power to the service panel;
      determine whether the second backup power source is available for supplying power to the service panel after determining the availability of the first backup power source;
      determine whether the third backup power source is available for supplying power to the service panel after determining the availability of the second backup power source;
      adjust power inputted from one or more of the first backup power source, the second backup power sources, and the third backup power source when a detected current rating exceeds a maximum ampacity rating; and
      send instructions to a remotely-controlled breaker to provide power to one or more of a plurality of electrical loads.

* * * * *